3,412,050
COAL TAR PREPOLYMERS AND THE CURE PRODUCTS THEREOF
Harold L. Elkin, Levittown, Chauncey C. De Pugh, Springfield, and Joseph L. Schwartz, Philadelphia, Pa., assignors to Thiokol Chemical Corporation, Bristol, Pa., a corporation of Delaware
No Drawing. Continuation-in-part of application Ser. No. 288,441, June 17, 1963. This application July 19, 1966, Ser. No. 566,209
10 Claims. (Cl. 260—2.5)

ABSTRACT OF THE DISCLOSURE

Liquid polyurethane prepolymers which are reaction products of a coal tar having an active hydrogen content and an organic diisocyanate. Also, the cured polyurethanes and polyurethane foams obtained from such prepolymers.

---

This application is a continuation-in-part of copending application S.N. 288,441 filed June 17, 1963, now abandoned.

This invention relates to liquid urethane prepolymers formed from liquid coal tars and arylene diisocyanates, and to the cured products obtained therefrom.

It is an object of the present invention to provide novel urethane prepolymers formed from liquid coal tars and arylene diisocyanates. Another object of this invention is to provide liquid coal tar urethane prepolymers which are controllable as to the amount of reactive isocyanate content present. A further object of this invention is to provide novel open cell foam structures from the coal tar urethane compositions of this invention. A still further object of this invention is to provide solid cast compositions from the coal tar urethane prepolymers of this invention. Yet, a still further object of this invention is to provide coating compositions from the coal tar urethane prepolymers of this invention and to provide upon their cure coherent coal tar urethane films.

The foregoing objects of this invention and those others which will become apparent hereunder are satisfied by the presently described novel urethane prepolymers formed from liquid coal tars and arylene diisocyanates, and by the cure products produced therefrom.

Many coal tar products are commercially available and have in common the property of being highly complex mixtures of aromatic molecules, which, when distilled, fractionated and otherwise treated produce a wide variety of useful aromatic compounds, such as phenol, xylene, benzene, naphtha, toluene, naphthalene, coal tar acids, such as cresylic acid, and dye-stuffs. Typical analysis of commercial coal tars reveals an active hydrogen content, as expressed by hydroxyl number, which may vary from 15 to 30, viscosities (at 80° F.) which span the range from that of very soft solids or very viscous liquids to that of fluid liquids of about 20 poises at 25° C., acid numbers are found which vary from about 0.05 to that of about 2, and water contents are found which also vary quite widely from about 0.05 to 1 percent. Elemental analysis of these coal tars reveals sulfur content between 1 and 1.5 percent, chlorine content from about 0.1 to 0.3 percent, nitrogen content from about 1 to 1.25 percent, carbon content from about 90 to 95 percent, hydrogen content from about 5 to 5.5% and oxygen content from about 0.75 to 1%.

The wide variation of water content present in different lots of one or the other types of various commercial coal tars makes it evident that quite troublesome problems are to be encountered in providing urethane compositions with reproducible and predictable properties. Attempts have been made in the past to cure conventional polyether, polythioether and polyester type urethane prepolymers using coal tar materials. It has been a most vexsome and serious problem, however, to obtain reproducible properties in the cured products thereof. Now, by the method and through the compositions of the present invention, useful cured urethane products are obtained of a more predictable and reproducible nature than were heretofore possible.

The prepolymer process employed in the preparation of coal tar urethane compositions of the present invention possesses regulating features which aid in controlling the reactive isocyanate content of the prepolymer compositions of this invention and therefore provides for an inherent method of assuring that the cured products of this invention have more controllable physical properties than were heretofore possible. According to the present invention, it has been unexpectedly found that useful and novel urethane prepolymers can be obtained if liquid coal tar materials are reacted with arylene diisocyanates. The coal tar materials should be liquid at the temperature of the reaction between them and the arylene diisocyanates. By liquid it is meant, within the concept of the present invention, that the material should be pourable.

The arylene diisocyanates which may be used in the present invention are aromatic diisocyanates which are free from urethane moieties. They may be defined in general by the formula $X(NCO)_2$ wherein X is (1) a bivalent aromatic nucleus such as e.g. phenylene, naphthylene, biphenylene, dinaphthylene, anthrylene, fluorenylene; or (2) a bivalent group consisting of two aromatic nuclei, such as those defined in (1), joined together by a bridging group free from urethane moieties. Examples of said bridging groups are hydrocarbon groups such as methylene, ethylene, propylene, isopropylene, ethenylene, ethynylene; oxahydrocarbon groups such as oxydimethylene; thiahydrocarbon groups such as thiodimethylene; azo; oxy; thio; sulfinyl; sulfonyl; and carbonyl groups. The aromatic nuclei in the arylene diisocyanates used in the present invention may be unsubstituted or may contain substituents which are not reactive with isocyanate groups, such as e.g. hydrocarbon, alkoxy, halogen, cyano, nitro, sulfonyl, carbonyl groups etc. Specific arylene isocyanates which are suitable for use in the present invention include the following:

o-Phenylene diisocyanate,
m-Phenylene diisocyanate,
p-Phenylene diisocyanate,
Toluene-2,4-diisocyanate,
Toluene-3,5-diisocyanate,
Toluene-2,6-diisocyanate,
Ethyl benzene-2,4-diisocyanate,
Ethyl benzene-3,5-diisocyanate,
Ethyl benzene-2,6-diisocyanate, Propyl benzene-2,4-diisocyanate,
Propyl benzene-3,5-diisocyanate,
Propyl benzene-2,6-diisocyanate,
Isopropyl benzene-2,4-diisocyanate,
Isopropyl benzene-3,5-diisocyanate,
Isopropyl benzene-2,6-diisocyanate,
n-Butyl benzene-2,4-diisocyanate,
n-Butyl benzene-3,5-diisocyanate,
n-Butyl benzene-2,6-diisocyanate,
Sec-butyl benzene-2,4-diisocyanate,
Sec-butyl benzene-3,5-diisocyanate,
Sec-butyl benzene-2,6-diisocyanate,
t-Butyl benzene-2,4-diisocyanate,
t-Butyl benzene-3,5-diisocyanate, and
t-Butyl benzene-2,6-diisocyanate,
n-Amyl benzene-2,4-diisocyanate,
n-Amyl benzene-3,5-diisocyanate,
n-Amyl benzene-2,6-diisocyanate,
Sec-amyl benzene-2,4-diisocyanate,
Sec-amyl benzene-3,5-diisocyanate,
Sec-amyl-2,6-diisocyanate,
2-methyl butyl benzene-3,5-diisocyanate,
2-methyl butyl benzene-2,6-diisocyanate,
Neopentyl benzene-2,4-diisocyanate,
Neopentyl benzene-3,5-diisocyanate,
Neopentyl benzene-2,6-diisocyanate,
n-Hexyl benzene-2,4-diisocyanate,
n-Hexyl benzene-3,5-diisocyanate,
n-Hexyl benzene-2,6-diisocyanate,
Sec-hexyl benzene-2,4-diisocyanate,
Sec-hexyl benzene-3,5-diisocyanate,
Sec-hexyl benzene-2,6-diisocyanate,
2-methyl pentyl benzene-2,4-diisocyanate,
2-methyl pentyl benzene-3,5-diisocyanate,
2-methyl pentyl benzene-2,6-diisocyanate,
3-methyl pentyl benzene-2,4-diisocyanate,
3-methyl pentyl benzene-3,5-diisocyanate,
3-methyl pentyl benzene-2,6-diisocyanate,
n-Heptyl benzene-2,6-diisocyanate,
n-Heptyl benzene-2,6-3-methyl hexyl benzene-2,4-diisocyanate,
2-ethyl pentyl benzene-2,4-diisocyanate,
n-Octyl benzene-2,4-diisocyanate,
n-Octyl benzene,3,5-diisocyanate,
2-ethyl hexyl benzene-2,4-diisocyanate,
n-Nonyl benzene-2,4-diisocyanate,
3-methyl octyl benzene-3,5-diisocyanate,
n-Decyl benzene-2,4-diisocyanate,
2-methyl nonyl benzene-2,6-diisocyanate,
n-Undecyl benzene-3,5-diisocyanate,
4-methyl decyl benzene-2,4-diisocyanate,
3-ethyl nonyl benzene-2,6-diisocyanate,
n-Dodecyl benzene-2,4-diisocyanate,
2-methyl undecyl benzene-3,5-diisocyanate,
n-Tridecyl benzene-2,6-diisocyanate,
n-Tridecyl benzene-2,4-diisocyanate,
4-ethyl undecyl benzene-2,6-diisocyanate,
n-Tetradecylbenzene-2,4-diisocyanate,
3-methyl-2-ethyl dodecyl benzene-2,4-diisocyanate,
n-Hexadecyl benzene-3,5-diisocyanate,
2,3,4-trimethyl tetradecyl benzene-2,4-diisocyanate, and
n-Octadecyl benzene-2,4-diisocyanate,
2,3,5,6-tetramethyl-1,4-phenylene diisocyanate,
2,4,5,6-tetramethyl-1,4-phenylene diisocyanate,
1,2,3-trimethyl-5-ethyl-4,6-phenylene diisocyanate,
1-methyl-2-ethyl-3,5-diisopropyl-4,6-phenylene diisocyanate,
2,6-dimethyl-3,5-di-t-butyl-1,4-phenylene diisocyanate,
2,5-diethyl-3,6-diisopropyl-1,4-phenylene diisocyanate,
2-methyl-3-ethyl-5-isobutyl-6-hexyl-1,4-phenylene diisocyanate,
1-methyl-3,5-diethyl-2,4-phenylene diisocyanate,
2,5-diethyl-1,4-phenylene diisocyanate,
2,6-diethyl-1,4-phenylene diisocyanate,
1-isopropyl-2,4-phenylene diisocyanate,
1-isopropyl-3,5-phenylene diisocyanate,
4,6-dimethyl-1,3-phenylene diisocyanate,
5,6-dimethyl-1,3-phenylene diisocyanate,
2,4-dimethyl-1,3-phenylene diisocyanate,
4-ethyl-2,6-tolylene diisocyanate,
4-propyl-2,6-tolylene diisocyanate,
4-n-amyl-2,6-tolylene diisocyanate,
4-t-butyl-2,6-tolylene diisocyanate,
4-isopropyl-2,6-tolylene diisocyanate,
4-ethoxy-1,3-phenylene diisocyanate,
4-butoxy-1,3-phenylene diisocyanate,
4-methoxy-1,3-phenylene diisocyanate,
4-methoxy-2,6-tolylene diisocyanate,
4-ethoxy-2,6-tolylene diisocyanate,
4-isopropoxy-2,6-tolylene diisocyanate,
4-chloro-1,3-phenylene diisocyanate,
4-bromo-1,3-phenylene diisocyanate,
4-chloro-2,4-tolylene diisocyanate,
4-chloro-2,6-tolylene diisocyanate,
4-bromo-2,6-tolylene diisocyanate,
4-fluoro-2,6-tolylene diisocyanate,
3,5-dichloro-2,4-tolylene diisocyanate,
3,5-dichloro-2,6-tolylene diisocyanate,
3,5-dibromo-2,4-tolylene diisocyanate,
3-bromo-5-chloro-2,4-tolylene diisocyanate,
5-bromo-3-chloro-2,4-tolylene diisocyanate,
6-bromo-3,5-dichloro-2,4-tolylene diisocyanate,
3,6-dichloro-2,4-tolylene diisocyanate,
5,6-dichloro-2,4-tolylene diisocyanate,
3,5,6-trichloro-2,4-tolylene diisocyanate,
3,5,6-tribromo-2,4-tolylene diisocyanate,
1-nitro-2,4-phenylene diisocyanate,
4-cyano-2,6-tolylene diisocyanate,
4-(N,N-dimethylamino)-2,6-tolylene diisocyanate,
1,4-naphthalene diisocyanate,
1,5-naphthalene diisocyanate,
1,8-naphthalene diisocyanate,
2,7-naphthalene diisocyanate,
9,10-anthracene diisocyanate,
1,4-anthracene diisocyanate,
2,5-fluorene diisocyanate,
3,3'-biphenyl diisocyanate,
4,4'-biphenyl diisocyanate,
3,3'-dimethyl-4,4'-biphenyl diisocyanate,
2,6-dimethyl-4,4'-biphenyl diisocyanate,
2-nitro-4,4'-biphenyl diisocyanate,
3,3'-dimethoxy-4,4'-biphenyl diisocyanate,
3,3'-dichloro-4,4'-biphenyl diisocyanate,
3-chloro-4,4'-biphenyl diisocyanate,
3,3'-diethyl-4,4'-biphenyl diisocyanate,
3,3'-diphenyl-4,4'-biphenyl diisocyanate,
3-phenyl-4,4'-biphenyl diisocyanate,
1,1'-dinaphthyl-2,2'-diisocyanate,
Terphenyl-4,4''-diisocyanate,
4,4'-diphenylmethane diisocyanate,
3,3'-dimethyl-4,4'-diphenylmethane diisocyanate,
2,2'-dimethyl-4,4'-diphenylmethane diisocyanate,
3,3',5,5'-tetramethyl-4,4'-diphenylmethane diisocyanate,
3,3'-dicyclohexyl-4,,4'-diphenylmethane diisocyanate,
Diphenyl ether-4,4'-diisocyanate,
Diphenyl ether-2,4'-diisocyanate,
Diphenyl sulfone-4,4'-diisocyanate,
Diphenyl sulfone-2,2'-diisocyanate,
Azobenzene-4,4'-diisocyanate,
Stilbene-2,4-diisocyanate,
Dibenzyl-4,4'-diisocyanate,
1,3-propylenebis(4-benzene isocyanate),
Benzophenone-4,4'-diisocyanate, The diisocyanates may be used alone or in combination with one another. The preferred diisocyanate is a 4:1 mol ratio mixture of the 2,4 and 2,6 isomers of tolylene diisocyanate.

The arylene diisocyanates used in the present invention may also be temporarily blocked with monofunctional active hydrogen containing materials such as e.g. alcohols, phenols, oximes, imides, naphthols, malonic ester, acetoacetic ester, acetamide, caprolactam prior to their reaction with the coal tar materials. Upon heating, the blocking agent is removed and the isocyanate groups are free to react with the active hydrogen groups in the coal tar.

The mode of formation of conventional urethane prepolymers is well known. Difunctional isocyanates are treated with less than stoichiometric amounts of polyfunctional active hydrogen bearing substances to produce urethane and/or urea type linkages in an organic structure which also possesses some reactive isocyanate sites. Further reaction at the active isocyanate sites with the same or other active hydrogen bearing substances produce, in a cure or crosslinking action, large three dimensional molecular structures usually of a solid and polymeric nature. The active hydrogen content of coal tars measured as hydroxyl number varies widely as also does their water content. The variation in water content from coal tar to coal tar and from lot to lot requires a variation in the amount of isocyanate values needed to react therewith and therefore removes different and uncontrollable amounts of isocyanate from further prescribable reaction with the active hydrogen bearing sites present on the coal tar molecules. It may be readily seen therefore that where coal tars are used merely as the cure or crosslinking compositions for conventional polyether, polythioether and/or polyester prepolymers of specific and predetermined isocyanate content that the variation that occurs in the water content and in the hydroxyl number of the various coal tars products and/or lots thereof produce cured products which will exhibit wide and unpredictable variation in properties. Where, however, as in the present invention, coal tars are used as the active hydrogen bearing substances in the preparation of urethane type prepolymers it may also be easily seen that prepolymers of a given isocyanate content may be readily prepared through the addition of such further amounts of arylene diisocyanates so as to compensate for inherent variation in water and hydroxyl values present from batch to batch in coal tar so as to provide coal tar prepolymers of a known and prescribable isocyanate content. Such coal tar prepolymers form the novel compositions of the present invention.

According to the practice of the present invention coal tars are reacted with arylene diisocyanate to give novel liquid curable coal tar urethane compositions. Through prior analysis of the coal tar to determine the water and other active hydrogen values present, the amount of arylene diisocyanates may then be prescribed to yield, upon reaction, the present novel prepolymers of prescribable isocyanate values.

The reaction according to the method of this invention may be carried out under nitrogen and at temperatures of about 60 to 150° C. for about 1 to 4 hours. The preferred temperature is about 105° C. for about two hours. Above about 150° C., the formation of undesired resinous products occurs, and below about 60° C. the formation of prepolymer is relatively slow. The prepolymer product produced is then analyzed for reactive isocyanate values and where an insufficiency is seen additional quantities of arylene diisocyanates may be added to the prepolymer blend to raise the isocyanate values to the desired level.

The coal tar prepolymers of the present invention, being of a prescribable isocyanate content, may be readily cured to form useful solid compositions, such as, castings, coatings, sealants and foams of reproducible and controllable properties through the use of conventional active hydrogen bearing cure agents such as are known to the urethane prepolymer arts, e.g., agents having active hydroxyl groups such as castor oil, trimethylolpropane, polyoxypropylene derivatives of trimethylolpropane and N,N,N',N'-tetrakis(2-hydroxypropyl) ethylene diamine liquid polysulfide polymers with mercaptan terminals, such as those disclosed in U.S. 2,466,963, and diamines such as 3,3'-dichlorobenzidine and 4,4'-methylene-bis(2-chloroaniline).

The cure or crosslinking reactions are those between isocyanate and active hydrogen sites on the prepolymer and cure agent respectively, carried out usually at elevated temperatures, ca. 150–250° F., for castings and coatings, and at ambient temperatures for foam production, over various time intervals from that of one minute to several hours. The chemical structures produced are complex polymeric organic molecules forming a three dimensional network of chemically bonded components; the prepolymer components and cure agent components being linked together through urethane bonds. The cure compositions are black solids which may be elastomeric to brittle in nature. The solid compositions produced may also be extremely soft and tacky compositions, of say Shore A hardness of 10 durometer degrees, to extremely hard tack-free compositions, of say Shore D hardness of 80 durometer degrees. Foams may be produced from prepolymers of this invention which may be flexible or rigid, and in general possess an open or closed cell structure. The variation in physical properties is occasioned largely by the type and amount of diisocyanate, coal tar and curing agent employed.

The preparation of liquid coal tar prepolymers of the present invention and their subsequent cure to form useful solid compositions, such as castings, coatings, sealants and forms are illustrated through the following examples. These examples while demonstrating preferred embodiments of the present invention are not to be considered as a limitation thereon, it being understood that many variations in the quality and quantity of coal tar compositions, isocyanate compositions, and cure compositions when employed by those versed in the art may be prepared and used without departing from the spirit and scope of this invention as defined by the claims.

EXAMPLE 1

This example deals with prepolymers and their cure products formed from a commercial coal tar, herein designated as Coal Tar I.

Coal Tar I

Coal Tar I is a complex mixture of aromatic compounds which in typical elemental analysis yields:

| Element | Percent by Weight | |
|---|---|---|
| Sulfur | 1.43, 1.15 | |
| Chlorine | 0.19, 0.11 | (Different |
| Nitrogen | 1.21, 1.09 | lots.) |
| Carbon | 91.42, 91.65 | |
| Hydrogen | 5.29 | |
| Oxygen | 0.81 | |

Typical batches of Coal Tar I show representative lot to lot variation as follows:

| Property | Lot A | Lot B | Lot C |
|---|---|---|---|
| Acid number | 1.01 | 0.10 | 0.67 |
| Hydroxy number | 23.5 | 27.80 | 17.63 |
| Percent water | 0.01 | 0.20 | 0.125 |
| Viscosity, poise (80° F.) | 55.7 | 55.7 | 55.0 |

PREPOLYMERS

According to the present invention prepolymers are formed from Coal Tar I by reaction of the coal tar with an arylene diisocyanate, in this example the 4/1 isomer mixture of 2,4/2,6 tolylene diisocyanate (TDI). Control of acidity during and after the process of prepolymer formation is often made by including some orthochlorobenzoyl chloride (OCBC) in the reaction mixtures, i.e., about 200–2000 parts per million, to slow down the reaction sufficiently to permit processing of system and to stabilize the prepolymer. The coal tar, 100 parts by weight (p.b.w.) of Coal Tar I for example, is charged into a reaction vessel, and then blanketed with nitrogen. To this, the isomer mixture of toluene diisocyanates is charged with stirring, in quantities as indicated in the table below. The reaction mixtures are permitted to exotherm, reaching temperatures of about 40° C. The pot mixtures are then heated to about 100° C., and maintained at this temperature with stirring for one hour, during which time reaction of the active hydrogen bearing materials present in the coal tar molecules and in impurities such as water occurs with isocyanate radicals of the arylene diisocyanate, consuming isocyanate values and forming urethane linkages with the coal tar, and urea linkages and carbon dioxide with the water. At the end of the reaction time, the pot product is cooled to ambient temperature, and analyzed for isocyanate content. Where the isocyanate content is too low for a desired end use, additional quantities of arylene diisocyanate are blended into the mixture for 15 minutes at about 70° C. with stirring as described below for prepolymer No. 1–9. The liquid prepolymer products are cooled and then used in cure formulations to produce castings, coatings, sealants and foams.

COAL TAR I PREPOLYMERS

| | P.b.w. TDI | P.b.w. OCBC | Product Percent NCO | Viscosity [1] |
|---|---|---|---|---|
| Prepolymer | | | | |
| 1–1 | 7.6 | --------- | 1.05 | 321 |
| 1–2 | 7.6 | 0.013 | 1.81 | 58.5 |
| 1–3 | 7.6 | 0.0105 | 2.42 | 81.8 |
| 1–4 | 18.7 | 0.013 | 3.92 | 35.3 |
| 1–5 | 18.7 | --------- | 4.63 | 55.0 |
| 1–6 | 18.7 | 0.013 | 4.72 | 21.5 |
| 1–7 | 18.7 | 0.0002 | 6.0 | 30.0 |
| 1–8 | 18.7 | 0.013 | 10.85 | 3.25 |
| 1–9 | [2] 43.55 | --------- | 12.15 | 31.4 |

[1] Viscosity of prepolymer formed (at 80° F.), in poise.
[2] Initial reaction between 100 p.b.w. of Coal Tar I and 18.75 p.b.w. of TDI for one hour at 100° C.; 24.8 p.b.w. of additional TDI added and reacted for 15 minutes at 70° C.

CASTOR OIL CURE PRODUCTS

Castings

Among prepolymer cure agents, castor oil is commonly used in the art to produce castings. Castor oil, a fixed oil obtained by cold-pressing the seeds of *Ricinus communis* L., Euphorbizceae, is a mixture consisting essentially of diglycerides of ricinoleic acid (about 80 to 86%); oleic acid (about 7 to 9%), linoleic acid. (About 3 to 3.5%), stearic acid (about 0.3%), and dihydroxystearic acid (about 0.6 to 1.8%.)

In this example, using some of the coal tar prepolymers prepared as above, castings were made by crosslinking the prepolymers with castor oil. The amounts of prepolymer and castor oil used were chosen to provide in the reaction mixture the ratio of 1.05 of isocyanate equivalents to hydroxyl equivalents.

The prepolymers are blended with castor oil and poured into molds to cure at the temperatures and times indicated in the table below. The pot life, or time during which the mixture of prepolymer and cross-link products is still pourable, the gel time, or time in which the reaction mixture has taken to set into a dimensionally stable state, and the tack-free time, or time in which the "set" reaction mixture has taken to solidify into a tack-free solid, again all measured at the temperature of cure, are also indicated in the following table, as indeed are the physical properties of the cured solids so produced after a seven day aging period at 75° F. and 50% relative humidity.

COAL TAR I PREPOLYMER CASTOR OIL CASTINGS

| Property | Prepolymer | | | | |
|---|---|---|---|---|---|
| | 1–1 | 1–2 | 1–6 | 1–8 | 1–9 |
| Isocyanate Content, percent | 1.05 | 1.81 | 4.72 | 10.85 | 12.15 |
| Castor Oil, p.b.w. | 8.0 | 14.0 | 35.8 | 84.3 | 94.1 |
| —NCO/—OH | 1.05 | 1.05 | 1.05 | 1.05 | .1.05 |
| Cure Temperature, ° F | 212 | 212 | 212 | 212 | 170 |
| Cure Time, hours | 2 | 2 | 2 | 2 | 1 |
| Pot Life, minutes | 43 | 51 | 11 | 9 | 16 |
| Gel Time, minutes | 83 | 103 | 20 | 20 | 18 |
| Tack-Free Time, minutes | 86 | >120 | 22 | 22 | 30 |
| Hardness, Shore A | 10 | --------- | 39 | 58 | 47 |
| Tensile Strength, p.s.i. | 31 | --------- | 199 | --------- | 245 |
| Elongation, percent | 143 | --------- | 94 | --------- | 84 |
| 50% Modulus, p.s.i. | 11 | --------- | 114 | --------- | 136 |
| Brittle Point Temperature. G10,000 value in ° F | +10 | --------- | −20 | --------- | −20 |
| Tear Resistance, p.i. | 7.5 | --------- | 21.6 | --------- | 20.6 |

Coatings or films

Use was made of the coal tar prepolymers of this invention and castor oil in solvent vehicles to produce coating compositions. Specifically, 100 p.b.w. of a 12.15% NCO coal tar prepolymer, designated above as "Prepolymer 1–9," was blended with 77.5 p.b.w. of castor oil and 177.5 p.b.w. of the cosolvent 2-ethoxyethyl acetate to form a brushable composition of —NCO/—OH ratio 1.28. After coating a substrate, therewith cure was effected at 125° C. in one hour to produce a coherent coating film, which when tested after ageing one day at 75° F. exhibited a tensile strength of 580 p.s.i., an elongation of 130%, a tear strength of 54 p.i., and a hardness of 56 Shore A durometer degrees.

OTHER CURE PRODUCTS

Foams

Foams have been prepared using the coal tar prepolymers of this invention when employed in conventional foaming procedures. The coal tar prepolymer is blended in this process with the foam blowing agent in one part, and the cure agent, surfactant and cure accelerator, usually an alkaline organic substance such as an amine or an organo-metallic salt such as lead octoate, are blended into a second part. Both parts of the foam formulation are mixed until a rise in temperature is noted due to the formation of a reaction exotherm. At this point the formulation is poured into a mold or container, and foaming is permitted to proceed. Foaming and gelation is essentially complete within five minutes to one hour. The foam produced is permitted to post cure and age for one week at ambient temperatures, ca. 75° F., prior to examination.

| | Foam 1 | Foam 2 | Foam 3 |
|---|---|---|---|
| Prepolymer 1–7 (% NCO=6), p.b.w. | 100 | 100 | 100. |
| Blowing Agent, p.b.w.: | | | |
| Trichloromonofluoromethane | 12 | --------- | --------- |
| Methyl Ethyl Ketone | --------- | 12 | 10. |
| Cure Agent, p.b.w., N,N,N',N', tetrakis (2-hydroxylpropyl) ethylenediamine. | 8.7 | 10 | 1.0 |
| Surfactant, p.b.w. | 0.5 | 0.5 | 0.5. |
| Cure Accelerator, p.b.w. Lead Octoate/Quadrol [1]=2/1. | 2.0 | 2.0 | 2.0. |
| Foam Time, minutes | 2 | 1 | 4. |
| Foam Color | Black | Black | Black. |
| Cell Structure | Open | Open | Open. |
| Friable | No | No | No. |
| Cell Size | Irregular [2] | Irregular | Irregular. |
| Foam Type | Flexible | Flexible | Flexible. |
| Strength | Good | Good | Weak. |

[1] Quadrol is N,N,N',N' tetrakis(2-hydroxylpropyl) ethylenediamine.
[2] Similar to natural sponge.

Other castings

Castings have been prepared using prepolymers from Coal Tar I with cure agents other than castor oil. The procedure used is as was described above for castor oil.

|  | Casting 1 | Casting 2 | Casting 3 | Casting 4 |
|---|---|---|---|---|
| Prepolymer | 1-2 | 1-2 | 1-6 | 1-8. |
| Percent NCO | 1.81 | 1.81 | 4.72 | 10.85. |
| Prepolymer, p.b.w. | 100.0 | 100.0 | 100.0 | 100.0. |
| Cure Agent, Type | —SH[1] | —OH[2] | —OH[3] | —OH.[3] |
| Cure Agent, p.b.w. | 82.3 | 3.0 | 14.9 | 34.3. |
| NCO/OH | 1.05 | 1.05 | 1.05 | 1.05. |
| Cure Temperature, °F | 212 | 212 | 212 | 212. |
| Cure Time, hours | 2 | 2 | 2 | 2. |
| Pot Life, minutes | 10 | 20 |  | 6. |
| Gel Time, minutes | 22 | 45 |  | 12. |
| Tack-Free Time, minutes | 120 | 120 |  | 14. |
| Cured Product Hardness [4] | ca. 20 | ca. 25 | 76 | 94. |

[1] A liquid polysilfide polymer having the structure: $HS(C_2H_4-O-CH_2-O-C_2H_4-S-S)_3-C_2H_4-O-CH_2-O-C_2H_4-SH$ wherein some of the polymer segments are branched.
[2] N,N,N′,N′-tetrakis(2-hydroxypropyl)ethylene diamine.
[3] Polyoxypropylene derivative of trimethylol propane, molecular weight of ca. 418.
[4] Shore A durometer degrees.

EXAMPLE 2

This example deals with prepolymers of this invention formed from a commercial coal tar, Coal Tar II.

Coal Tar II

Analysis of a typical batch gave an acid number of 0.10, an hydroxyl number of 21.01, and a water content of 0.175%.

PREPOLYMERS

Prepolymers 2–1, 2–2, and 2–3 of this invention are formed in this example through reaction of 100 pbw. of Coal Tar II with TDI and OCBC according to the procedure as is described in Example 1.

|  | P.b.w. TDI | P.b.w. OCBC | Product Percent NCO | Viscosity [1] |
|---|---|---|---|---|
| Prepolymer: |  |  |  |  |
| 2–1 | 8.29 | 0.02 | 2.6 | 151 |
| 2–2 | 13.0 | 0.02 | 4.9 | 390 |
| 2–3 | 16.0 |  | 5.6 | 121 |

[1] At 80° F. in poise.

EXAMPLE 3

In this example another coal tar, Coal Tar III, was used according to the procedure of Example 1 to produce a very viscous coal tar prepolymer, 3–1, having 5.5% isocyanate content and a viscosity of 431 poise at 120° F. It was prepared by treating 100 parts of the coal tar with 17.06 parts of the 2,4/2,6 isomer mixture of toluence diisocyanate and 0.02 part of orthochlorobenzoyl chloride.

Coal Tar III, in typical analysis, shows an acid number of 0.105, an hydroxyl number of 25.9, and a water content of 0.14%. It is an extremely viscous liquid at 80° F.

EXAMPLE 4

Another commercial coal tar, Coal Tar IV, is used in this example to produce prepolymers 4–1 and 4–2 of this invention. The procedure described in Example 1 was employed.

|  | P.b.w. TDI | P.b.w. OCBC | Product Percent NCO | Viscosity [1] |
|---|---|---|---|---|
| Prepolymer: |  |  |  |  |
| 4–1 | 9.05 | 0.0023 | 2.88 | 568 |
| 4–2 | 14.7 | 0.0023 | 4.5 | 82 |

[1] At 80° F. in poise.

Coal Tar IV shows in typical analysis an acid number of 0.16, an hydroxyl number of 27.12, a water content of 0.115% and a viscosity at 80° F. of 37.9 poise.

EXAMPLE 5

In this example prepolymers 5–1, 5–2, and 5–3 of this invention were prepared from Coal Tar V. Coal Tar V shows in typical analysis an acid number of 0.095, an hydroxyl number of 15.24, a water content of 0.13% and a viscosity at 80° F. of 490 poise.

100 p.b.w. of Coal Tar V were used in the procedure described in Example 1 with TDI and OCBC to produce the following prepolymers:

|  | P.b.w. TDI | P.b.w. OCBC | Product Percent NCO | Viscosity [1] |
|---|---|---|---|---|
| Prepolymer: |  |  |  |  |
| 5–1 | 5.58 | 0.02 | 1.62 | 626 |
| 5–2 | 12.46 | 0.02 | 4.36 | 225 |

[1] At 80° F. in poise.

Prepolymer 5–1 was further treated, 100 pbw., with 109 pbw. of TDI at 70° C. for 15 minutes to raise the product isocyanate content to ca. 26%. The product, prepolymer 5–3, was then cured in a casting formulation with N,N,N′,N′-tetrakis(2-hydroxylpropyl)ethylenediamine. 40.5 p.b.w. of prepolymer 5–3 was intimately mixed with 18.25 p.b.w. of N,N,N′,N′-tetrakis(2-hydroxypropyl)ethylenediamine in a cup mold. The mixture exothermed to ca. 145° C. The black bubble-free casting produced was tack-free in one minute, completely hard in 5 minutes, and after cooling had a hardness of 80 Shore D durometer degrees.

The prepolymers formed in Examples 2, 3 and 4 can also be used to make the cured products described and produced in Examples 1 and 5.

The compositions for castings as described in Example 1 may also be employed as sealants.

We claim:

1. A liquid urethane prepolymer formed by reacting a coal tar having an active hydrogen content with a stoichiometrically excess quantity of arylene diisocyanate at a temperature of about 60 to 150° C. for a period of about 1 to 4 hours.

2. A prepolymer as in claim 1 wherein the arylene diisocyanate has the formula $X(NCO)_2$ wherein X is selected from the group consisting of (1) a bivalent aromatic nucleus and (2) a bivalent group consisting of two aromatic nuclei joined together by a bridging group free from urethane moieties.

3. A prepolymer as in claim 2 in which the bridging group is selected from the group consisting of hydrocarbon, oxahydrocarbon, thiahydrocarbon, azo, oxy, thio, sulfinyl, sulfonyl and carbonyl groups.

4. A prepolymer as in claim 1 wherein said arylene diisocyanate is at least one of such diisocyanates selected from the group consisting of phenylene, naphylene, biphenylene, anthrylene, fluoroenylene, carbonyldiphenyl, oxydiphenyl, azodiphenyl, thiodiphenyl, sulfinyldiphenyl, sulfonyldiphenyl, methylenediphenyl, ethylenediphenyl, propylenediphenyl, ethenylenediphenyl, ethynylenediphenyl and isopropylenediphenyl diisocyanates, said arylene diisocyanates being unsubstituted or containing substituents which are non-reactive with isocyanate groups.

5. A prepolymer as in claim 1 wherein said coal tar has an active hydrogen content, as expressed by hydroxyl number, of about 15 to 30.

6. A prepolymer as in claim 1 which is formed by reacting said arylene diisocyanate and said coal tar at about 105° C. for about 2 hours.

7. A solid reaction product formed by reacting the liquid urethane prepolymer of claim 1 with a curing agent which contains active hydrogen groups.

8. A reaction product as in claim 7 wherein said curing agent is selected from the group consisting of castor oil, trimethylolpropane, polyoxypropylene derivatives of trimethylolpropane, N,N,N′,N′ - tetrakis(2 - hydroxypropyl)ethylenediamine, 3,3′-dichlorobenzidine, 4,4′-methylenebis(2 - chloroaniline) and polypthiopolymercaptan polymers.

9. A polyurethane foam produced by curing, in the presence of a blowing agent, the prepolymer of claim 1 with a curing agent containing active hydrogen groups.

10. A coating which comprises the reaction product of the liquid urethane prepolymers of claim 1 and a curing agent containing active hydrogen groups.

References Cited

UNITED STATES PATENTS 3,182,032   5/1963   Charlton et al. _____ 260—28

FOREIGN PATENTS 855,911   7/1949   Germany.

DONALD E. CZAJA, *Primary Examiner.*

M. B. FEIN, *Assistant Examiner.*

UNITED STATES PATENT OFFICE
CERTIFICATE OF CORRECTION

Patent No. 3,412,050                                        November 19, 196

Harold L. Elkin et al.

It is certified that error appears in the above identified patent and that said Letters Patent are hereby corrected as shown below:

Column 3, lines 14 and 61, cancel "and", each occurrence; line 21, "Sec-amyl-2,6-diisocyanate" should read -- Sec-amyl benzene-2,6-diisocyanate --; lines 40 and 41, "n-heptyl benzene-2,6-3-methyl hexyl benzene-2,4-diisocyanate" should read -- n-heptyl benzene-2,6-diisocyanate, 3-methyl hexyl benzene-2,4-diisocyanate --. Column 5, line 73, after "diamin insert a comma. Column 6, line 28, "forms" should read -- foa --. Column 7, line 62, "linoleic acid. (About 3 to 3.5%)," should read -- linoleic acid, (about 3 to 3.5%), --. Columns 7 and 8, first table, sixth column, line 3 thereof, ".1.05" should read -- 1.05 --. Column 8, last table, fourth column, line 3 thereof, "10." should read -- 12. --; same table, same column, line 4 thereof, "1.0" should read -- 10 --. Column 9, footnote to the first table, line 1 thereof, "polysilfide" should read -- polysulfide --; line 51, "toluence" should read -- toluene --. Column 10, line 68, "fluoroenylene" shoul( read -- fluorenylene --. Column 11, lines 15 and 16, "poly-pthiopolymercaptan" should read -- polythiopolymercaptan --.

Signed and sealed this 10th day of March 1970.

(SEAL)
Attest:

EDWARD M. FLETCHER, JR.                            WILLIAM E. SCHUYLER, JR
Attesting Officer                                             Commissioner of Patents